United States Patent
Boutaghou et al.

(10) Patent No.: US 6,535,355 B2
(45) Date of Patent: *Mar. 18, 2003

(54) PITCH AND ROLL ATTITUDE CONTROL FOR SLIDERS IN A DISK DRIVE

(75) Inventors: Zine Eddine Boutaghou, Vadnais Heights, MN (US); Aric Kumaran Menon, Bloomington, MN (US)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,535

(22) Filed: Dec. 8, 1998

(65) Prior Publication Data

US 2001/0012182 A1 Aug. 9, 2001

Related U.S. Application Data

(60) Provisional application No. 60/069,137, filed on Dec. 8, 1997.

(51) Int. Cl.⁷ .............................................. G11B 5/58
(52) U.S. Cl. .................................................. 360/245.7
(58) Field of Search .......................... 360/265.1, 234.6, 360/234.7, 265.9, 294.2, 245.7; 29/603.03, 594; 428/148

(56) References Cited

U.S. PATENT DOCUMENTS

| | | | | |
|---|---|---|---|---|
| 4,651,245 A | * | 3/1987 | Kanno | 360/246.8 |
| 4,724,500 A | * | 2/1988 | Dalziel | 360/245.7 |
| 4,933,785 A | | 6/1990 | Morehouse et al. | 360/78.04 |
| 5,034,837 A | | 7/1991 | Schmitz | 360/105 |
| 5,235,482 A | | 8/1993 | Schmitz | 360/97.02 |
| 5,367,419 A | * | 11/1994 | Kazama | 360/245.7 |
| 5,455,723 A | | 10/1995 | Boutaghou et al. | 360/75 |
| 5,530,606 A | * | 6/1996 | Baasch et al. | 360/104 |
| 5,557,488 A | * | 9/1996 | Hamilton et al. | 360/104 |
| 5,786,961 A | * | 7/1998 | Goss | 360/245.1 |
| 5,815,349 A | * | 9/1998 | Frater | 360/104 |
| 5,883,759 A | * | 3/1999 | Schulz | 360/104 |
| 5,987,733 A | * | 11/1999 | Goss | 29/603.03 |
| 6,011,671 A | * | 1/2000 | Masse et al. | 360/104 |
| 6,021,021 A | * | 2/2000 | Alt et al. | 360/245.7 |
| 6,028,740 A | * | 2/2000 | Konno et al. | 360/245.7 |
| 6,046,883 A | * | 4/2000 | Miller | 360/104 |
| 6,067,209 A | * | 5/2000 | Aoyagi et al. | 360/245.7 |
| 6,088,202 A | * | 7/2000 | Kabasawa et al. | 360/245.7 |
| 6,163,438 A | * | 12/2000 | Kajitani | 360/245.7 |
| 6,172,853 B1 | * | 1/2001 | Davis et al. | 360/245.7 |

\* cited by examiner

*Primary Examiner*—Brian E. Miller
*Assistant Examiner*—Chen Tianjie

(57) ABSTRACT

An information handling system, such as a disk drive, includes a base, a disk stack rotatably attached to the base, and an actuator assembly movably attached to the base. The actuator assembly also includes a load spring and a slider attached to said load spring. A ramp is also attached to the base near the disk stack. The ramp is used to load and unload the sliders to and from the disk. The slider and load spring are attached to form a gimballing connection between the slider and the load spring. A motion limiting device is attached to either the slider or the load beam to limit the pitch and roll of the slider with respect to the load spring at the gimballing connection. The motion limiters can be added to the load spring or the slider or both. An actuator assembly may also include a stiff lead. A slider including at least one transducer is attached to the stiff lead. The slider also has at least one pad electrically connected to the transducer. A flexible joint apparatus is attached at one end to the lead and attached at the other end to the at least one pad of the slider. The flexible joint apparatus is made of an electrically conductive material. The flexible joint apparatus also includes a plurality of openings therein to form a waffle like structure.

25 Claims, 10 Drawing Sheets

PITCH AND ROLL ATTITUDE CONTROL FOR SLIDERS IN A DISK DRIVE

RELATED APPLICATION

This application claims the benefit of U.S. Provisional Application Serial No. 60/069,137, filed Dec. 8, 1997 under 35 USC119(e).

FIELD OF THE INVENTION

The present invention relates to the field of mass storage devices. More particularly, this invention relates to a disk drive which includes a device for controlling the pitch and roll attitudes of the sliders as they are loaded and unloaded from the surface of the disk in the disk drive.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high revolutions per minute ("RPM"). These days common rotational speeds are 7200 RPM. Rotational speeds in high performance disk drives are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The slider has an air bearing surface ("ABS") which includes rails and a cavity between the rails. The air bearing surface is that portion of the slider that is nearest the disk as the disk drive is operating. When the disk rotates, air is dragged between the rails and the disk surface causing pressure, which forces the head away from the disk. At the same time, the air rushing past the depression in the air bearing surface produces a negative pressure area at the depression. The negative pressure or suction counteracts the pressure produced at the rails. The different forces produced counteract and ultimately fly over the surface of the disk at a particular fly height. The fly height is the thickness of the air lubrication film or the distance between the disk surface and the head. This film eliminates the friction and resulting wear that would occur if the transducing head and disk were in mechanical contact during disk rotation.

The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 1–2 micro inches. In some disk drives, the ceramic block does not fly on a cushion of air but rather passes through a layer of lubricant on the disk. A flexure is attached to the load spring and to the slider. The flexure allows the slider to pitch and roll so that the slider can accommodate various differences in tolerance and remain in close proximity to the disk.

Information representative of data is stored on the surface of the memory disk. Disk drive systems read and write information stored on tracks on memory disks. Transducers, in the form of read/write heads attached to the sliders, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive occurs just before the disk drive shuts down or during the initial moment when the disk drive starts. When shutdown occurs, the small ceramic block or slider is typically flying over the disk at a very low height. In the past, the small block or slider was moved to a non-data area of the disk where it literally landed and skidded to a stop. Problems arise in such a system. When disks were formed with a smooth surface, stiction forces occur between the slider and the disk surface. In some instances, the forces due to separate the slider from the suspension. Another problem is that landing a slider on the disk may limit the life of the disk drive. Each time the drive is turned off another contact start stop cycle occurs. After many contact start stop cycles, the small ceramic block or slider may chip or produce particles. The particles could eventually cause the disk drive to fail. When shutting down a disk drive, several steps are taken to help insure that the data on the disk is preserved. In general, the actuator assembly is moved so that the transducers do not land on the portion of the disk containing data. There are many ways to accomplish this. A ramp on the edge of the disk is one design method that has gained industry favor more recently. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837.

Typically, the ramp is positioned to the side of the disk. A portion of the ramp is positioned over the disk itself. In operation, before power is actually shut off, the actuator assembly moves the suspension, slider and transducer to a park position on the ramp. When the actuator assembly is moved to a position where parts of the suspension are positioned on the top of the ramp, the sliders or ceramic blocks do not contact the disk. Commonly, this procedure is referred to as unloading the heads. Unloading the heads helps to insure that data on the disk is preserved since, at times, unwanted contact between the slider and the disk results in data loss on the disk. The actuator assembly may be provided with a separate tang associated with each head suspension. The tang may ride up and down the ramp surface. In other drives, the ramp may be positioned such that the suspension rides up and down the ramp to unload and load the disk or disks of the disk drive. When starting up the disk drive, the process is reversed. That is to say that the suspension and slider are moved from the ramp onto the surface of the disk. This is referred to as loading the heads onto the disk.

During load and unload of the slider onto the disk, the slider typically rolls and pitches. Sometimes the slider pitches or rolls too much. The result is that the slider may then contact the disk. In other words, if the slider rolls too much when it is loaded or unloaded, the edge of the slider may contact the disk. If the slider pitches too much when the is loaded or unloaded, the front or back edge of the slider may contact the disk. Combinations of too much pitch and roll may cause the corners of the slider to contact the disk. Whenever the slider contacts the disk there is a possibility that the slider may damage the magnetic surface on the disk or that the slider may be damaged. Either event can result in loss of data. When the disk surface is damaged, such as by the slider gouging the surface of the disk, information stored at the gouge may be lost immediately. When the slider is damaged, such as by a portion of the slider coming off of the disk, the particles generated go into the drive and may eventually cause a head crash. The damage is greater at the higher rotational speeds of the disks in the disk drives. What is needed is a system and method for controlling the attitude of the slider in a disk drive. More specifically what is needed is a system for controlling the amount of pitch and roll of the slider. What is also needed is a system which is easy to manufacture and a system that also does not require adjustment. The system must also be rugged and stable over time. In other words, the system must be able to last for the life of the drive. The system must also be made of materials that will out gas to a minimum so that contaminants will not be added to the disk drive enclosure which could contaminant the lubricant on the disk. The system must also provide for easy rework and must also allow for gimballing of the slider with respect to the suspension.

There is still a further need for a system which eliminates or substantially reduces the moment produced on the slider by the electrical connection to the transducer. In addition, there is a need for systems which can be designed to allow a selected amount of stiffness in both the pitch and roll direction so that the slider is capable of adapting while passing over or flying over the disk.

SUMMARY OF THE INVENTION

An information handling system, such as a disk drive, includes a base, a disk stack rotatably attached to the base, and an actuator assembly movably attached to the base. The actuator assembly also includes a load spring and a slider attached to said load spring. A ramp is also attached to the base near the disk stack. The ramp is used to load and unload the sliders to and from the disk. The slider and load spring are attached to form a gimballing connection between the slider and the load spring. A motion limiting device is attached to either the slider or the load beam to limit the pitch and roll of the slider with respect to the load spring at the gimballing connection. The motion limiters can be added to the load spring or the slider or both. The motion limiters can be pieces of adhesive backed tape. The motion limiters can also be formed as features in the load spring or formed as features in the slider or can be formed as features in both the load spring and the slider. The slider attached to the load spring is also called a head gimbal assembly and the attachment of the slider to the load spring in a head gimbal assembly is also contemplated. The motion limiters limit roll and pitch attitudes at critical times in the operation of the disk drive, such as during the loading of the sliders to the disk from a ramp, and such as during the unloading of the sliders to the ramp from the disk.

Advantageously, during load and unload of the slider to and from the disk, the attitude of the slider is controlled along the pitch and roll axes to prevent the slider from contacting the disk. The motion limiters prevent slider roll during load and unload, so that the edge of the slider does not contact the disk. The motion limiters prevent slider pitch so that the front or back edge of the slider does not contact the disk during load and unload. The motion limiters also prevent the slider corners from contacting the disk. This lessens the possibility that the slider may damage the magnetic surface on the disk, or that the slider may be damaged, either of which can cause a head crash or other loss of data. The motion limiters control the attitude of the slider. In addition, higher rotational speeds can be used in the disk drives without having to worry about the increased risk of a head crash. The motion limiters control the amount of pitch and roll of the slider. The motion limiters are easy to manufacture and also do not require adjustment. The motion limiters are also be rugged and stable and last for the life of the drive. The motion limiters provide for easy rework and allow for gimballing of the slider with respect to the suspension.

An actuator assembly includes a stiff lead. A slider including at least one transducer is attached to the stiff lead. The slider also has at least one pad electrically connected to the transducer. A flexible joint apparatus is attached at one end to the lead and attached at the other end to the at least one pad of the slider. The flexible joint apparatus is made of an electrically conductive material. The flexible joint apparatus also includes a plurality of openings therein to form a waffle like structure. The structure is also called a cage structure. The flexible joint apparatus includes a bend between the one end attached to the lead and the other end attached to the pad of the slider. The bend allows for additional compliance in the connection between the slider and the lead so that different tolerances can be accommodated. The actuator assembly may also include a plurality of leads and a slider having a plurality of pads for electrically connecting to at least one transducer. A plurality of flexible joint apparatus can be used to attach each one of the plurality of leads to the plurality of pads of the slider. During manufacture, the plurality of flexible joint apparatus are attached to one another to prevent problems associated with electrostatic discharge. The attachment between the adjacent flexible joint apparatus is removed by laser ablation or some other means later in the manufacture.

Advantageously, the flexible joint system eliminates or substantially reduces the moment produced on the slider by the electrical connection to the transducer. The flexible joint system can also be designed to allow a selected amount of stiffness in both the pitch and roll direction so that the slider is capable of adapting while passing over or flying over the disk. The design can incorporate different openings to control the amount of stiffness in the pitch and roll directions. In addition, a bend can be used to further control the stiffness in the pitch and roll directions. Still a further advantage is that the flexible joints are made of an electrically conductive material so that the flexible joint not only provides mechanical flex between the stiff leads and the slider but also provides for the electrical connection between the slider and the stiff leads.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
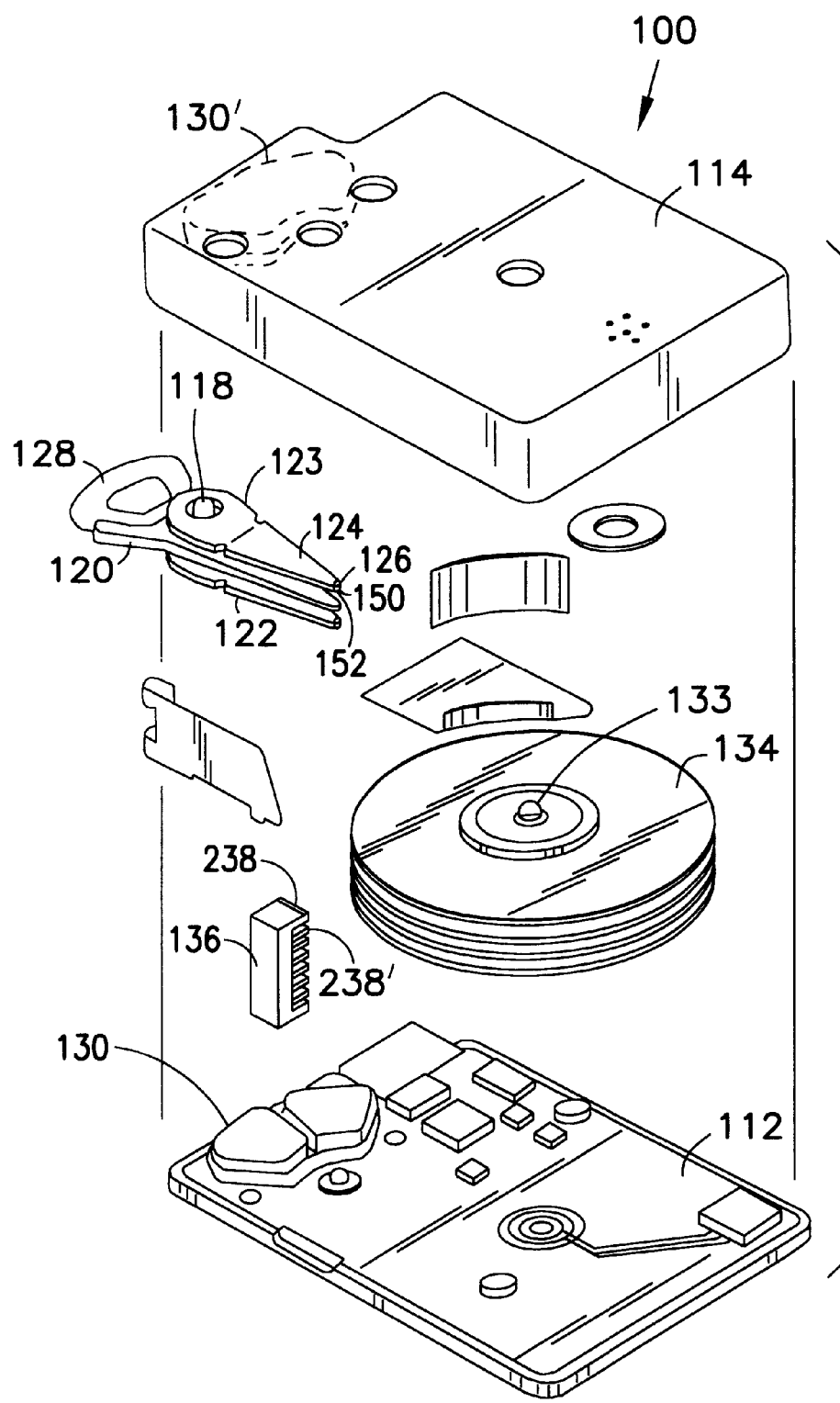
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comblike structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading sliders 126 to the disk 134 and unloading the sliders 126 from the disk. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
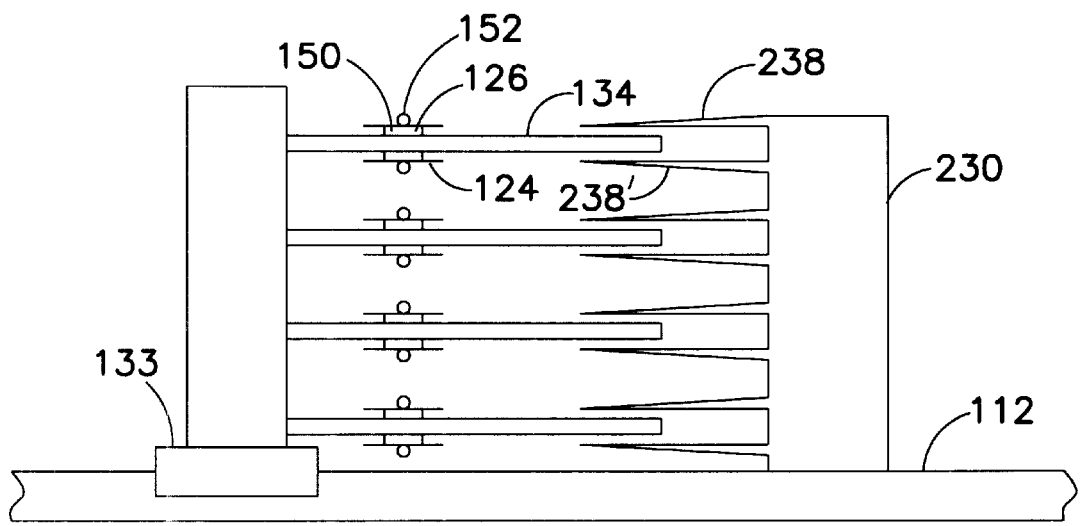
FIG. 2 is a side view of a disk drive having a ramp structure.

Also attached to the base 112 is a ramp structure 136. FIG. 2 is a side view of a disk drive having a ramp structure. Now looking at FIG. 2, the ramp structure will be described in more detail. The ramp structure 136 has a plurality of individual ramps 238 and 238'. One ramp is associated with each surface of the disk. As shown, there is a ramp portion 238 for the top surface of a disk and a ramp 238' for a bottom surface of the disk 134. The ramp portion 238 is for the loading and unloading the transducer from the top surface of a disk 134 and the ramp portion 238' is for loading and unloading a transducer from the bottom surface of a disk 134. The disk drive shown in FIG. 2 has four disks. Each disk 134 has two surfaces so there are a total of eight disk surfaces within the disk drive shown. Only one disk and set of ramps 238 and 238' are labeled. The other disks and ramps are similar to the labeled disk 134 and set of ramps 238 and 238'. The ramp structure 136 shown in FIG. 2 is fixed to the base of the disk drive. The ramp structure can be formed as one unitary part or can be assembled from a number of different parts. For example, the ramp structure 134 shown could be comprised of four parts. Each part would include a set of ramps 238 and 238' and a main body 230 to which the ramps 238 and 238' are attached. A portion of each of the ramp portions 238 and 238' of the ramp is positioned over the disk 134. It should be noted that this invention could also be used on ramps that rotate in and out of a load/unload position.

Also shown in FIG. 2 are the load springs 124, which are referred to by some as load beams or suspensions, and the attached load tangs 152. The load tangs 152 are attached to the load springs 124. The slider 126 and transducer 150 carried by the slider are not illustrated in FIG. 2 for the sake of clarity. All the load springs 124 and tangs 152 are attached to the actuator. Moving the actuator assembly 120 moves all the load springs 124 and load tangs 152. In operation, the actuator assembly 120 is moved to a park position when the disk drive is powered down. Moving the actuator to the park position causes the load tangs 152 associated with each load spring 124 to ride up the ramp 238 or 238' associated with the surface of the disk 134. This is referred to as unloading the disk. When the disk drive is powered on, the actuator moves to an operating position by moving the load springs 124, load tangs 152, sliders and transducers off their respective ramps 238 or 238' into a transducing position over the surface of the disk 134. This is referred to as loading the disk. The load springs 124, load tangs 152 sliders 126 and transducers 150 of the disk drive are shown in a transducing position in FIG. 2. It should be noted that much of the actuator assembly 120 has been eliminated from FIG. 2 for the sake of clarity.

Figure 3:
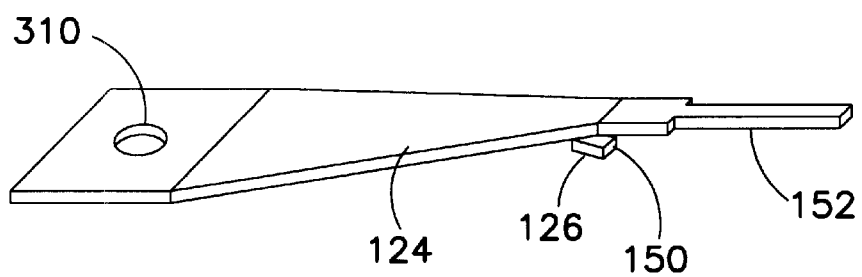
FIG. 3 is a perspective view of a load beam and load tang.

FIG. 3 is a perspective view of a load spring 124 and tang 152. The load spring 124 is a triangular structure which acts as a cantilevered spring to place a small load onto the slider 126 when the slider 126 is in transducing relationship with the disk 134. The load spring 124 is attached at its wider end to an actuator arm 123. The load spring 124 shown in FIG. 3 has a swage opening 310 and a swage plate 312 in the wider end. The swage opening 310 and swage plate 312 are used to attach the load spring 124 by a process referred to as swaging. Other attachment methods may also be used without departing from the spirit of this invention. The tang 152 is attached to a free end 320 of the load spring 124. The tang 152 is shown as an elongated cylinder. Also attached to the load spring 124 is the slider 126. The transducer 150 is carried by or within the slider 126. The tang 152 includes a gimbal dimple 600.

Pitch and Roll Control With Attitude Limiters

Figure 4:
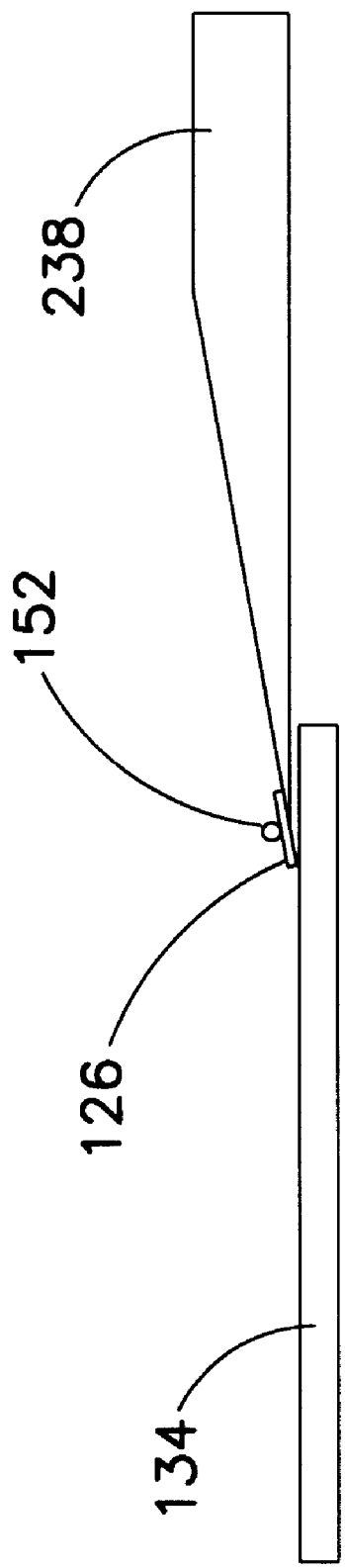
FIG. 4 is a end view of a slider on the tip of the ramp structure.

FIG. 4 is an end view of the slider 126 at the tip of the ramp structure 238. This is the position of the slider 126 either during loading of the slider 126 from the ramp 238 onto the disk or during unloading of the slider from the disk 134. During unloading, the slider 126 is removed from the surface of the disk 134 and parked on the ramp 238. As can be seen, the slider tilts or rolls either during loading or unloading of the slider when a ramp is used.

Figure 5:
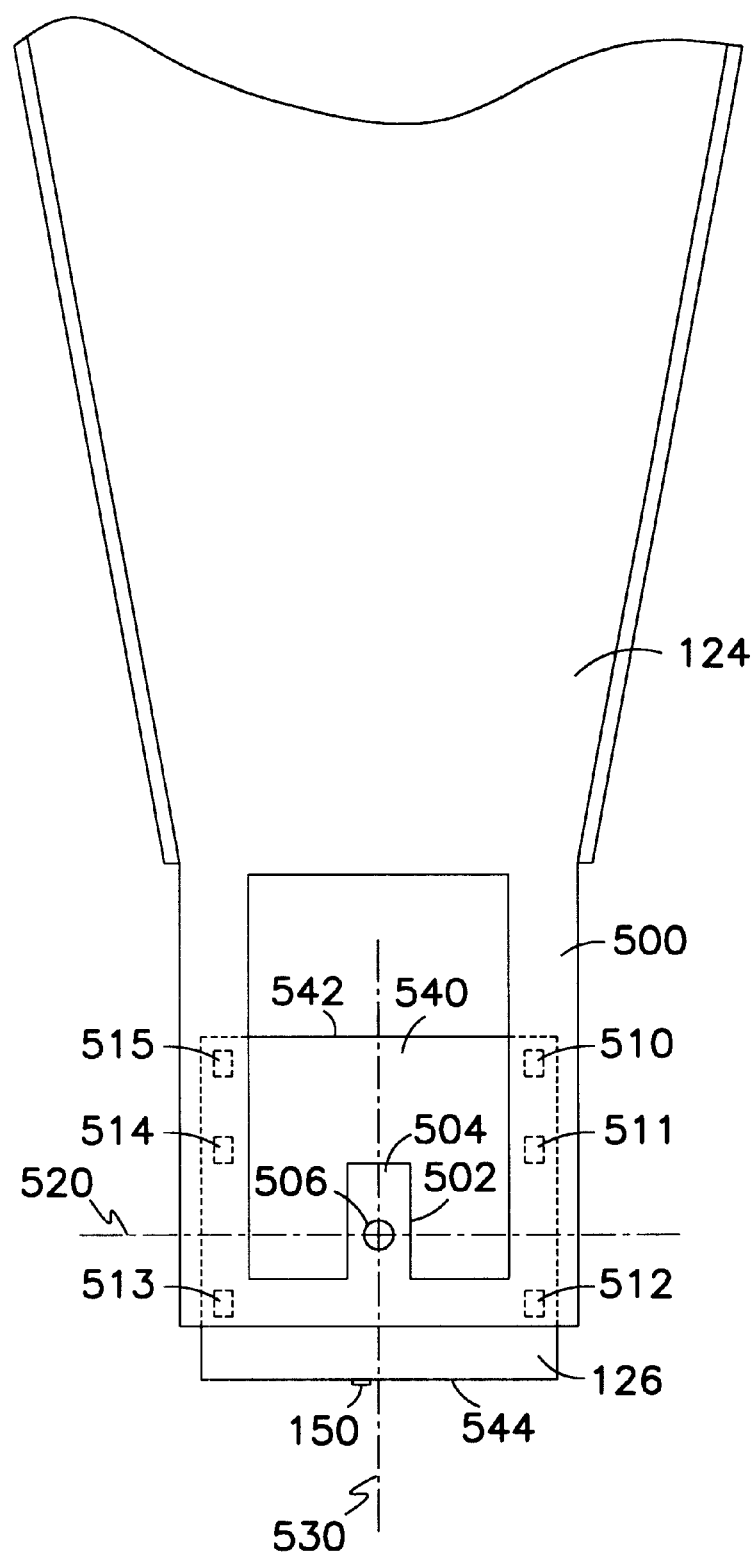
FIG. 5 is a top view of the slider showing the attitude limiters.

FIG. 5 is a top view of a portion of the lower beam 124 which has an integrated flexure 500. The slider 126 is attached to the flexure 500 portion of the load spring 124. The flexure includes a tongue 502 which includes an attachment point 504 for the slider 126 and a gimbal dimple or load protuberance 506. Also shown in FIG. 5 are a plurality of attitude or motion limiters 510, 511, 512, 513, 514 and 515. In this particular embodiment the attitude limiters or motion limiters 510, 511, 512, 513, 514 and 515 are attached to the flexure 500 portion of the load beam 124. Also shown in FIG. 5 is a pitch axis 520 and a roll axis 530 of the slider 126. The attitude limiters of motion limiting pads 510, 511, 512, 513, 514 and 515 are placed so that they will control the amount of pitch or movement about the pitch axis 520 as well as control the amount of movement about the roll axis 530 of the slider. In other words, the attitude limiting pads or motion limiting pads 510–515 are placed so that only a certain amount of pitch and a certain amount of roll is allowed by the slider 126. It should be noted that the placement of the attitude limiters or motion limiters can be repositioned from the position shown in FIG. 5 to place different restraints on the slider 126 in terms of rotation about the pitch axis 520 and rotation about the roll axis 530. For example, to provide for additional freedom about the roll axis the attitude limiters or motion limiters 510–515 can be repositioned so that the pads are closer to the roll axis 530. It should be noted that the load protuberance 506 is formed into the tongue 502 of the flexure portion 500 of the load beam. The load protuberance 506 is a curved surface about which the slider 126 pitches and rolls. In other words, the pitch axis 520 and the roll axis 530 of the slider pass through the gimbal dimple or load protuberance 506.

FIG. 5 also shows the backside 540 of the slider 126. The slider 126 also has a leading edge 542 and a trailing edge 544. As the slider 126 flies the leading edge 542 is the forward or leading portion. A transducer 150 is shown positioned in the trailing edge 544 of the slider 126. The transducer 150 is shown schematically as the transducer could be a thin film head which is typically placed on the trailing edge 544 of the slider or could be an MR or magneto resistive head which includes a thin film write element and an MR strip which is integral with the slider 126. In an MR head there is actually a separate read element and write element. The use of the attitude limiters or motion limiters 510–515 is not limited by the type of transducer used. Furthermore, FIG. 5 shows a load beam 124 that has an integral flexure 500 portion. Other designs may have a separate flexure which is attached to the load spring 124. The use of the attitude limiters or motion limiters 510–515 is equally applicable in a design which has a separate flexure attached to the load beam 124.

Figure 6:
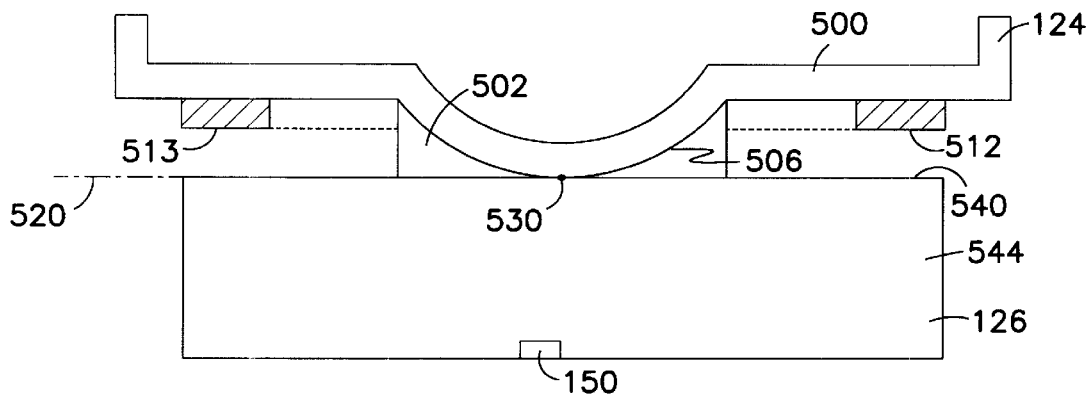
FIG. 6 is an end view of the slider attached to a load beam from the trailing edge of the slider which shows the attitude limiters attached to the load spring.

FIG. 6 is an end view of the slider 126 attached to the load beam 124 as viewed from the trailing edge 544 of the slider 126. FIG. 6 shows the attitude limiters 513 and 512 attached to the flexure 500 portion of the load beam 124. The flexure portion includes the load protuberance 506 which is the contact point between the slider 126 and the flexure portion 500 of the load beam 124. Also shown in FIG. 6 is the roll axis 530. The contact point of the load protuberance 506 is the intersection of the roll axis 530 and the pitch axis 520 of the slider 126. In other words, the slider 126 gimbals about the contact point between the load protuberance 506 and the backside 540 of the slider 126. As the slider moves, or more specifically, rotates about the roll axis 530 the attitude limiters or motion limiters 512 and 513 limit the amount of motion through which the slider 126 can move. In other words, if the slider 126 moves about the roll axis 530 the attitude limiter or motion limiter 513 will prevent further rotation of the slider 126 about the roll axis. Similarly, the attitude limiter or motion limiter 512 will also limit the amount of rotation of the slider 126 about the roll axis 530.

Figure 7:
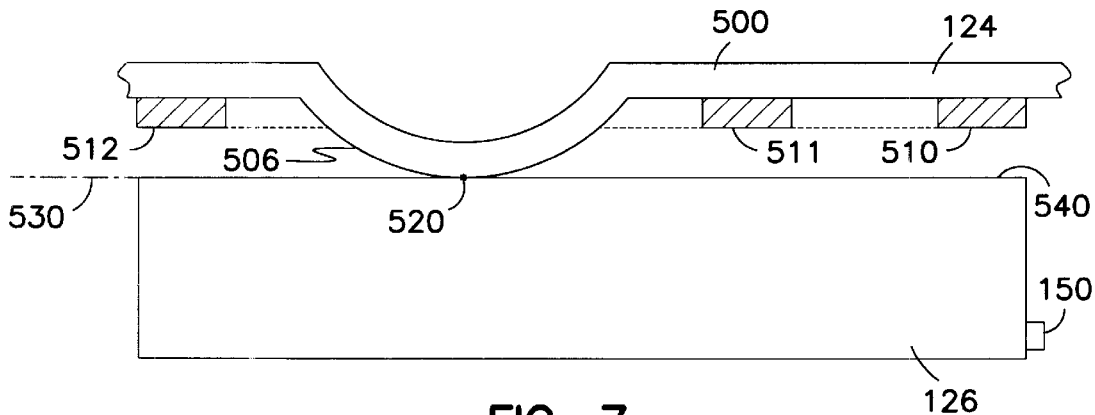
FIG. 7 is a detailed side view of the slider attached to the load spring which shows the attitude limiters attached to the load spring.

FIG. 7 is a detailed side view of the slider 126 attached to the flexure portion 500 of the load spring 124. The attitude limiters or motion limiters 510, 511 and 512 are attached to the flexure portion 500 of the load spring 124. As the slider 126 moves or rotates about the pitch axis 520 the attitude limiters or motion limiters 510, 511 and 512 limit the amount of pitch about the pitch axis 520 of the slider 126. For example, as the slider 126 rotates in a counter-clockwise direction about the pitch axis 520, the motion limiter or attitude limiter 510 will be contacted and thereby limiting the amount of rotation of the slider 126 about the pitch axis 520. In one preferred embodiment of the invention the motion limiters or attitude limiters 510–515 are made of a tape with an adhesive backing. It is contemplated that in another preferred embodiment the motion limiters or attitude limiters 510–515 could be formed as an integral part of the flexure portion 500 of the load beam 124. For example, the motion limiters or attitude limiters 510–515 could be stamped into the flexure portion 500 of the load beam 124. Use of a tape having an adhesive backing provides some advantages. The use of tape provides additional damping of the flexure portion 500 of the load beam. For example, the amplitude of the sway mode is reduced by adding the tape motion limiters 510–515. In addition the natural frequency of the entire gimbal is increased simply by constraining the system with the motion limiters or attitude limiters 510–515. Use of tape also provides for a simple chain in the amount of constraint of the pitch attitude and roll attitude of the slider 126. For example, by varying the thickness of the tape, the amount of pitch and the amount of roll through which the slider 126 may travel can be easily changed which may be required by a redesign. In addition, the amount of pitch and roll due to other forces such as when a signal-carrying wire is attached to the slider 126 is now more controlled. Another advantage is that the settle time associated with a seek will be lessened due to the additional damping offered by the tape attached as attitude limiters or motion limiters 510–515.

Figure 8:
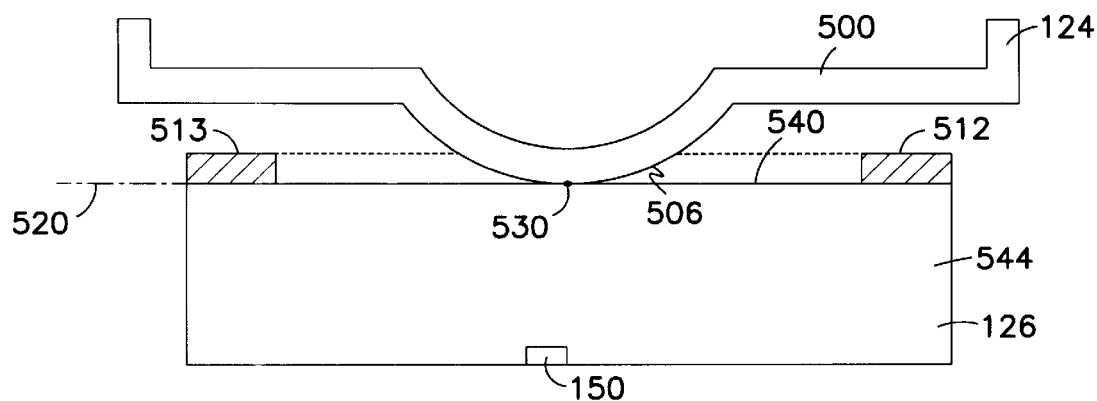
FIG. 8 is an end view of the slider attached to a load beam from the trailing edge of the slider which shows the attitude limiters associated with the slider.
Figure 9:
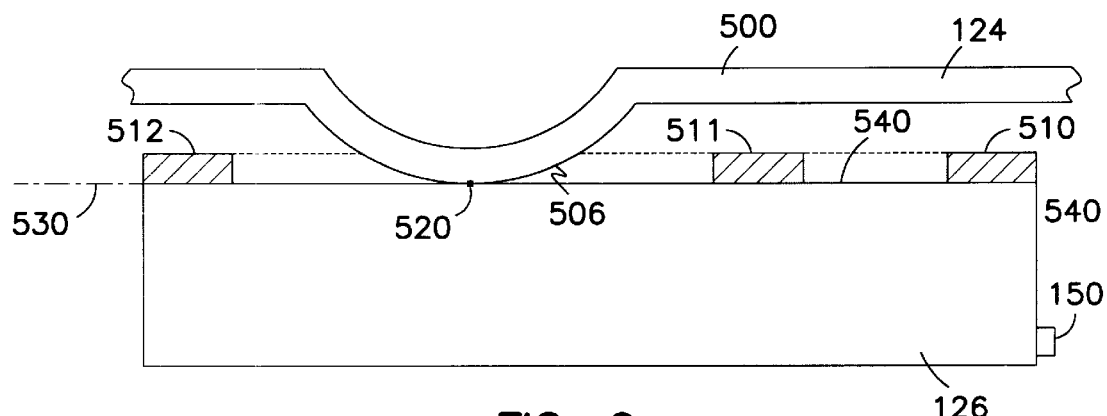
FIG. 9 is a detailed side view of the slider attached to the load spring which shows the attitude limiters associated with the slider.

FIGS. 8 and 9 show another preferred embodiment of the invention. In the preferred embodiment showed in FIGS. 8 and 9 the motion limiters are attached to the slider 126 rather than to the flexure portion 500 of the load beam 124. Since most of the components of the embodiment shown in FIGS. 8 and 9 are the same as the components shown in FIGS. 7 and 8, the discussions of FIGS. 8 and 9 will center around the differences between the two embodiments. As shown in FIGS. 8 and 9 the motion limiters or attitude limiters 510–515 are attached to the slider 126. More specifically, the motion limiters or attitude limiters 510–515 are attached to the backside 540 of the slider 126. The motion limiters 510–515 work in exactly the same way. For example, when the slider 126 moves about the pitch axis 520 in a counter-clockwise direction the motion limiter 510 restrains the motion when the pad 510 contacts the flexure portion 500 of the load beam 124. Similarly, when the slider 126 is rotating about the roll axis in a counter-clockwise direction the pad 512 will impinge the flexure portion 500 of the load beam 124. This of course limits the amount of roll through which the slider can pass. By thickening the motion limiter or varying the height of the load protuberance 506 or even by varying the thickness of the adhesive used to attach the slider 126 to the flexure portion 500 of the load beam 124, the amount of pitch and roll of the slider can be adjusted. Advantageously, once an appropriate amount of pitch and roll is achieved, the system can be easily manufactured by using uniform thickness of the attitude limiters or motion limiters 510–515 and by controlling the load protuberance 506 as well as the amount of adhesive used to attach the flexure portion to the slider 126. All of these distances can be held to within selected tolerances to provide for a substantially uniform amount of constrained pitch and roll of the slider 126.

It is also contemplated that the motion limiters or attitude limiters 510–515 shown in FIGS. 8 and 9 could be formed integral with the slider 126. For example, the motion limiters 510–515 could be formed by etching away a portion of the backside 540 of the slider using common photolithography techniques. The paths or motion limiters 510–512 could be formed by masking the backside and exposing the mask to form a proper pattern whereby the motion limiters are covered by a mask and then the other portions are removed so that an etchant may be used to etch away a portion of the backside 540 of the slider 126.

Advantageously, during load and unload of the slider to and from the disk, the attitude of the slider is controlled along the pitch and roll axes to prevent the slider from contacting the disk. The motion limiters prevent slider roll during load and unload, so that the edge of the slider does not contact the disk. The motion limiters prevent slider pitch so that the front or back edge of the slider does not contact the disk during load and unload. The motion limiters also prevent the slider corners from contacting the disk. This lessens the possibility that the slider may damage the magnetic surface on the disk, or that the slider may be damaged, either of which can cause a head crash or other loss of data. The motion limiters control the attitude of the slider. In addition, higher rotational speeds can be used in the disk drives without having to worry about the increased risk of a head crash. The motion limiters control the amount of pitch and roll of the slider. The motion limiters are easy to manufacture and also do not require adjustment. The motion limiters are also be rugged and stable and last for the life of the drive. The motion limiters provide for easy rework and allow for gimballing of the slider with respect to the suspension.

Pitch and Roll Control With Flexible Joint

Figure 10:
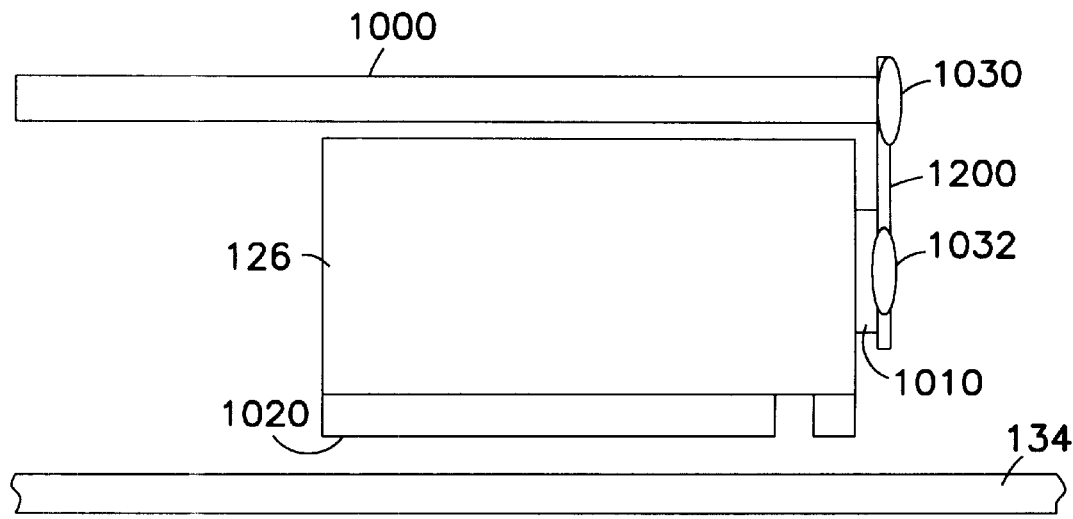
FIG. 10 is a side view of the slider attached to a stiff lead using a flexible joint apparatus.
Figure 11:
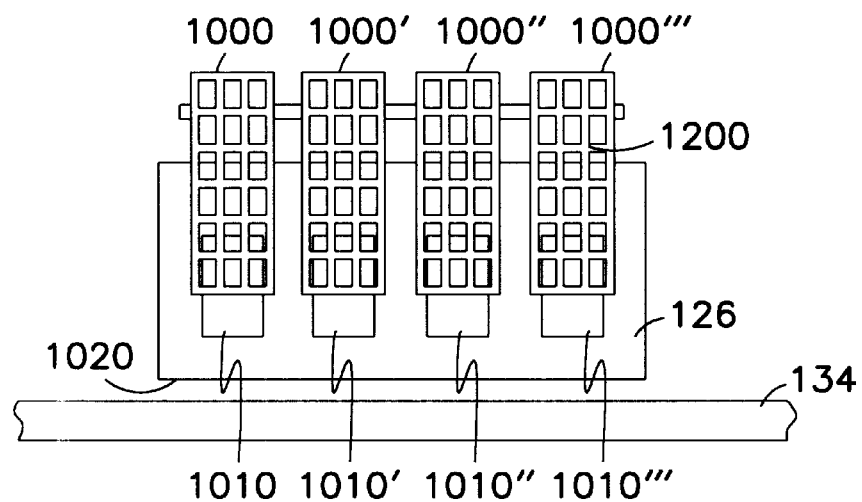
FIG. 11 is a end view of the slider attached to a stiff lead using a flexible joint apparatus.

FIGS. 10 and 11 show another preferred embodiment of a motion limiter used to control the pitch and roll of a slider 126. FIG. 10 is a side view of the slider 126 attached to a stiff lead 1000 using a cage type flexible joint apparatus 1200. The stiff lead 1000 can be any stiff structure used to carry electrical signals to and from the transducer. For example, the stiff lead could be a copper wire emerging from a polyimide flex cable which is common for flex on suspension arrangements ("FOS"). Stiff leads also emanate from suspensions that use trace suspension assemblies ("TSA"). TSA is available from Hutchinson Technology of Hutchinson, Minn. The cage structure or flexible joint apparatus 1200 is connected between the stiff lead 1000 and a electrical contact pad 1010 which is attached to one transducer 150 positioned near an air bearing surface 1020 near the cage structure or flexible joint apparatus 1200 is soldered at one end to the stiff lead 1000 and soldered at the other end to the pad 1010 of the slider 126. A first solder ball 1030 results on the stiff lead 1000 and a second solder ball 1032 occurs on the pad 1010 of the slider 126. The air bearing surface ("ABS") 1020 is the portion of the slider 126 nearest the disk 134. The air bearing surface 1020 is the portion that slides or passes near the disk 134.

FIG. 11 is an in view of the slider 126 attached to the stiff lead 1000 using the flexible joint apparatus or cage structure 1200. As shown in FIG. 11, there is more than one stiff lead 1000. As shown in FIG. 11, there are four stiff leads 1000 which emanate from a structure such as flex on suspension or TSA. An advantage of this arrangement is that the stiff leads 1000 do not have to be bent and therefore a moment from a bent stiff lead is not placed on the slider 126. In the past moments from leads had to be accounted for when controlling the pitch and static attitude of the slider 126. The slider 126 includes four pads 1010, 1010', 1010", and 1010'". This is a common arrangement in transducers that actually carries a separate read element and a separate write element. The read element is typically magnetoresistive and the write element may be a thin film head. This arrangement is common in a magnetoresistive head or slider 126 which includes a magnetoresistive head. Other arrangements are contemplated for giant MR ("GMR") and other future head technologies. As shown in FIG. 11, the cage structure or flexible joint 1200 is connected between a stiff lead 1000, 1000', 1000", or 1000'" and a pad 1010, 1010', 1010", 1010'", respectively. Advantageously the cage structure or flexible joint 1200 serves a dual purpose. The cage structure 1200 is made of an electrically conductive metal and is also designed to be flexible in certain directions so that the pitch and roll static attitude of the slider 126 can also be controlled. In other words, the cage structure or flexible joint 1200 is designed to provide a flexible connection between stiff leads 1000, 1000', 1000'', 1000''' and the electrical pads 1010, 1010', 1010'', and 1010''' as well as to provide the electrically conductive path between the stiff leads 1000, 1000', 1000'', and 1000''' and the pads 1010, 1010', 1010'', and 1010'''. The cage structures 1200 are designed to flexibly attach the slider 126 to the set of stiff leads 100 as well as to carry electrical signals from the pads 1010, 1010', 1010'', and 1010''' to the stiff leads 1000, 1000', 1000'', and 1000'''. By using the flexible joint apparatus or cage structure 1200 the stiffness of the stiff leads 1000 can be taken out of or disregarded as part of the air bearing sensitivity analysis.

Figure 12:
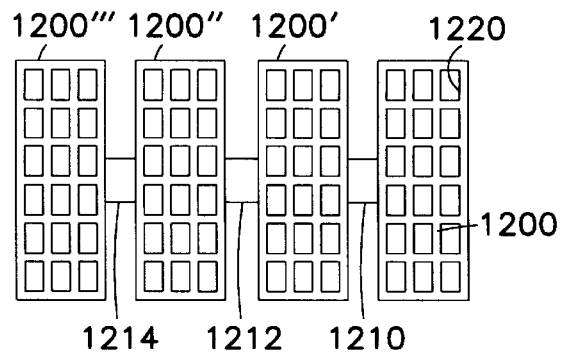
FIG. 12 is a detailed view of the cage structure used for the flexible joint apparatus.

FIGS. 10 and 11 show one example of a flexible joint apparatus 1200 as applied between a stiff lead 1000 and a transducer 126. Now turning to FIGS. 12–14, the fabrication of the cage structure or flexible joint apparatus 1200 will be further detailed. FIG. 12 is a detailed view of the cage structure or flexible joint apparatus 1200. The flexible cage apparatus 1200 is formed from thin sheets of metal which are etched to form a waffle like structure. As shown in FIG. 12, each flexible joint apparatus 1200 is shaped as a large rectangle. The flexible joint apparatus 1200 includes a plurality of rectangular openings 1220 which forms a waffle structure. It should be noted that the degree of stiffness can be controlled by determining the size of the openings 1220 in the cage structure or flexible joint apparatus 1200 are not limited to rectangular openings. The openings 1220 can be ellipses, squares, circles, or any other geometric shaped desired. By changing the geometric shapes and the size of the openings with respect to the flexible joint apparatus 1200 the stiffness in both the roll and pitch direction of the attached flexible joint apparatus 1200 can be controlled. The resulting structure is only limited in its design in that it needs to be electrically conductive between each of the ends of the cage structure or flexible joint apparatus 1200. In other words, the cage structure that results must have desirable electrical conductive properties.

Figure 14:
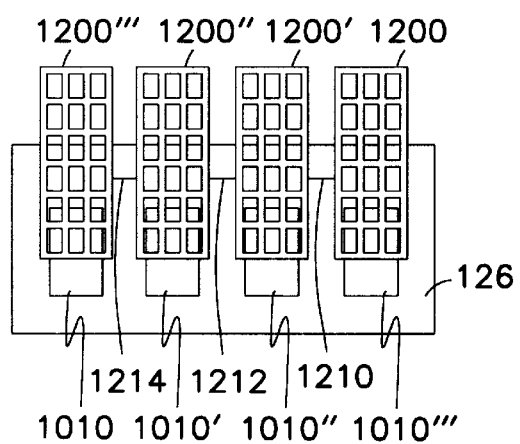
FIG. 14 is a end view of one of the sliders shown in FIG. 13 with an attached cage structure after the number of sliders have been diced into individual sliders.

Also shown in FIG. 12 are a second flexible joint apparatus 1200', a third flexible joint apparatus 1200'', and a fourth flexible joint apparatus 1200'''. Each of the flexible joint apparatus is electrically attached to the adjacent flexible joint apparatus. For example, flexible joint apparatus 1220 or 1200 is attached by an electrical link 1210 to the flexible joint apparatus 1200'. Flexible joint apparatus 1200' is connected to flexible joint apparatus 1200'' by an electrical link 1212. Similarly, flexible joint apparatus 1200'' is connected to flexible joint apparatus 1200''' by an electrical link 1214. FIG. 12 shows a single overall apparatus that would apply to a slider 126 as shown in FIG. 14.

Figure 13:
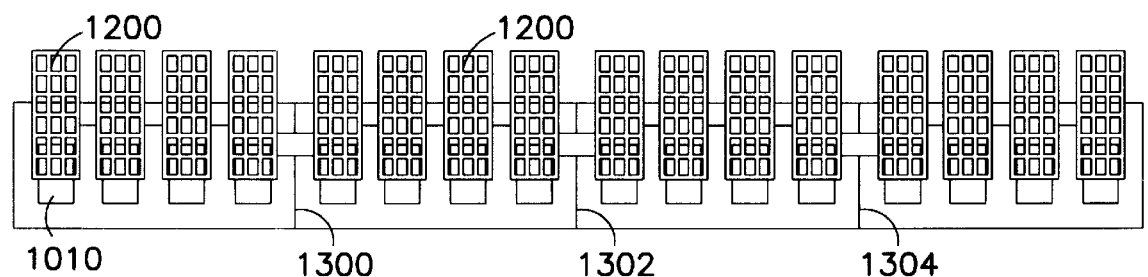
FIG. 13 is a end view of the a number cage structures attached to a number of sliders.

FIG. 13 shows an end view of a number of cage structures attached to a number of sliders before the sliders are formed. Generally, in manufacture a large number of joint apparatus, such as 1200, will have to be attached to a number of pads 1010 at a single time. There are electrical links such as 1210, 1212, and 1214 between adjacent flexible joint apparatus or cage structures 1200. The electrical links 1210, 1212, and 1214 allow any electrostatic build-up to be removed from the entire structure. As shown in FIG. 13, there is a row of ceramic with 16 leads 1010 which will eventually form four separate sliders 126. Each adjacent cage structure or flexible joint apparatus 1200 is connected to an adjacent flexible joint apparatus or cage structure 1200 by an electrical link. The electrical link allows for any electrostatic charge that may build up on the entire structure shown in FIG. 13 to be discharged so that the flexible cage apparatus 1200, a transducer or any other electrically sensitive element associated with the entire structure 13 will not be ruined by electrostatic discharge. The plurality of cage structures 1200 are placed onto the pads 1010 and soldered into place. Once soldered, the entire structure is diced along lines 1300, 1302, and 1304 to form individual sliders 126 with four pads 1010, 1010', 1010'', and 1010''' and their attached cage structures 1200''', 1200'', 1200', and 1200, respectively. The slider 126 formed by dicing along line 1300, 1302, and 1304 is shown in FIG. 14. In other words, FIG. 14 is an end view of one of the sliders 126 shown after dicing the structure in FIG. 13 so that a number of individual sliders result. The electrical links 1210, 1212, and 1214 remain in place until the flexible joint apparatus 1200, 1200', 1200'', and 1200''' are attached to stiff leads 1000, 1000', 1000'', and 1000'''. Once the flexible cages 1200, 1200', 1200'', and 1200''' are attached to the leads 1000''', 1000'', 1000', and 1000, respectively, the electrical connections 1210, 1212, and 1214 are removed. Typically the electrical connections 1210, 1212, and 1214 are removed by laser ablation.

Figure 15:
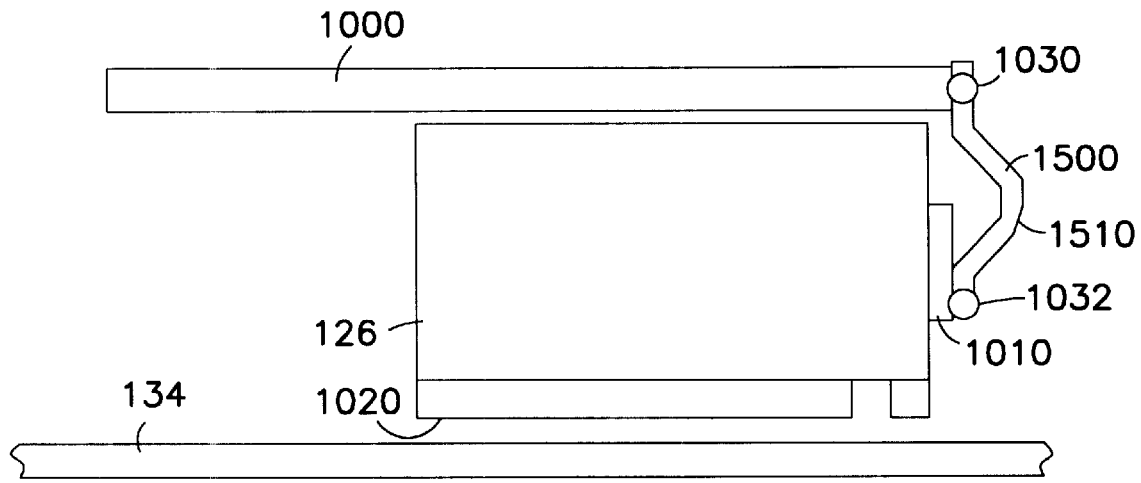
FIG. 15 is a side view of the slider attached to a stiff lead using a flexible joint apparatus having a bend therein.

The end result is the slider 126 attached to the stiff leads 1000, 1000', 1000'', and 1000''' by the cage structures 1200, 1200', 1200'', and 1200'''. The electrical connections 1210, 1212, and 1214 have been removed so that each of the cages acts as an electrical conductor between the electrical pad and the stiff lead to which each one attaches. After laser ablation, the structure appears as shown in FIG. 11. FIG. 11 shows the finished structure. FIG. 15 shows another embodiment of the flexible joint apparatus. In FIG. 15 a flexible joint apparatus 1500 includes a pre-bent region 1510. The pre-bent region allows for additional compliance to accommodate additional tolerances without causing bias to the slider 126. The prebent region integrates additional perforations or openings, such as openings 1220 shown in FIG. 12, without causing bias to the slider 126. The pre-bent design also includes additional perforations or openings 1220 to further reduce the stiffness of the connecting joint that results by electrically connecting the flexible joint apparatus 1500 between the pad 1010 on the slider 126 and to the stiff lead 1000. The flexible joint apparatus 1500 is connected by soldering or other connection means and results in the solder ball 1030 on the stiff lead 1000 and at an in the solder ball 1032 on the electrical pad 1010.

Figure 16:
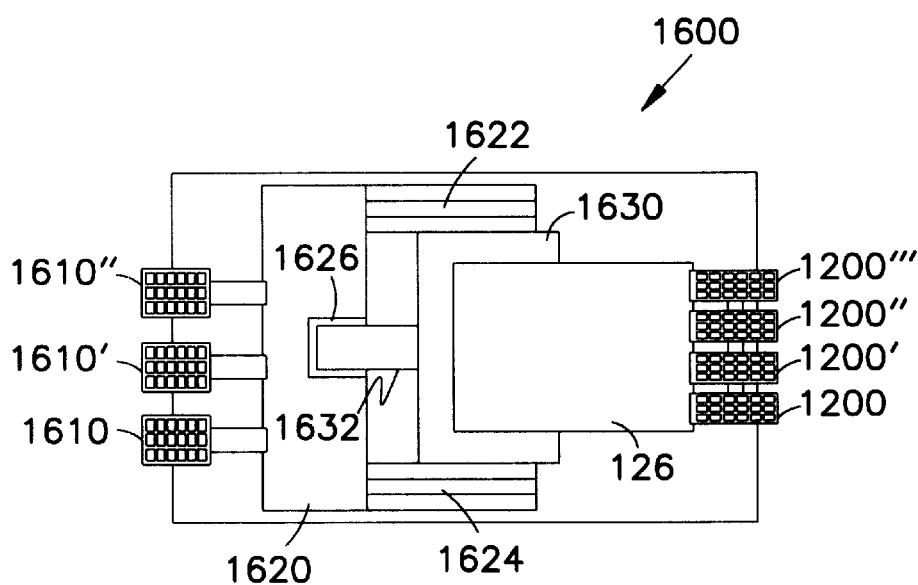
FIG. 16 is a top view of micro-actuator and attached slider which uses the cage structure type flexible joint apparatus.

Use of the flexible joint apparatus or cage structures 1200 is not only useful in attaching a transducer 126 to a stiff lead 1000 but also has other applications. For example, as shown in FIG. 16, the flexible cage apparatus 1200 is used to attach a slider 126 of a microactuator assembly 1600. In addition, other flexible cage structures 1610, 1610', and 1610'' are used to electrically connect the microactuator 1620 to a DC current source and ground. A piezoelectric type motor or an electrostatic motor is used to move the transducer 126. One portion of the motor 1620 includes a first leaf spring 1622 and a second leaf spring 1624. As shown, silicon springs may be used. A yoke 1630 is attached to the slider 126. Attached to the yoke 1630 is an extension element 1632. The microactuator 1620 has an opening 1626 therein. The extension 1632 of the yoke 1630 extends into the opening 1626 by energizing the element 1620 the extension element 1632 will move with respect to the element 1620. In addition, the silicon springs 1622 and 1624 will also move to produce a small motion in the slider 126.

Microactuators are needed to make small adjustments of the slider to enable the slider 126 to track follow over very tightly packed tracks. The cage structures or flexible joint apparatus 1200, 1200', 1200'', and 1200''' allow the slider to move without having large moment placed on the slider 126. Similarly, the cage structures 1610, 1610', and 1610'' also allow the element 1620 to be electrically connected to a power source and ground without torquing or biasing the element 1620 of the microactuator.

Advantageously, the flexible joint apparatus eliminates or substantially reduces the moment produced on either the slider or other elements associated with the transducer. The cage structure or flexible joint apparatus 1200 can also be used for both the electrical connection as well as the flexible connection. In addition, the cage structure can be designed to allow for a certain amount of stiffness in both the pitch and roll direction so that the slider is capable of adapting to differences in fly height as it passes over a disk.

In summary, an actuator assembly includes a stiff lead. A slider including at least one transducer is attached to the stiff lead. The slider also has at least one pad electrically connected to the transducer. A flexible joint apparatus is attached at one end to the lead and attached at the other end to the at least one pad of the slider. The flexible joint apparatus is made of an electrically conductive material. The flexible joint apparatus also includes a plurality of openings therein to form a waffle like structure. The structure is also called a cage structure. The flexible joint apparatus includes a bend between the one end attached to the lead and the other end attached to the pad of the slider. The bend allows for additional compliance in the connection between the slider and the lead so that different tolerances can be accommodated. The actuator assembly may also include a plurality of leads and a slider having a plurality of pads for electrically connecting to at least one transducer. A plurality of flexible joint apparatus can be used to attach each one of the plurality of leads to the plurality of pads of the slider. During manufacture, the plurality of flexible joint apparatus are attached to one another to prevent problems associated with electrostatic discharge. The attachment between the adjacent flexible joint apparatus is removed by laser ablation or some other means later in the manufacture.

Advantageously, the flexible joint system eliminates or substantially reduces the moment produced on the slider by the electrical connection to the transducer. The flexible joint system can also be designed to allow a selected amount of stiffness in both the pitch and roll direction so that the slider is capable of adapting while passing over or flying over the disk. The design can incorporate different openings to control the amount of stiffness in the pitch and roll directions. In addition, a bend can be used to further control the stiffness in the pitch and roll directions. Still a further advantage is that the flexible joints are made of an electrically conductive material so that the flexible joint not only provides mechanical flex between the stiff leads and the slider but also provides for the electrical connection between the slider and the stiff leads.

Figure 17:
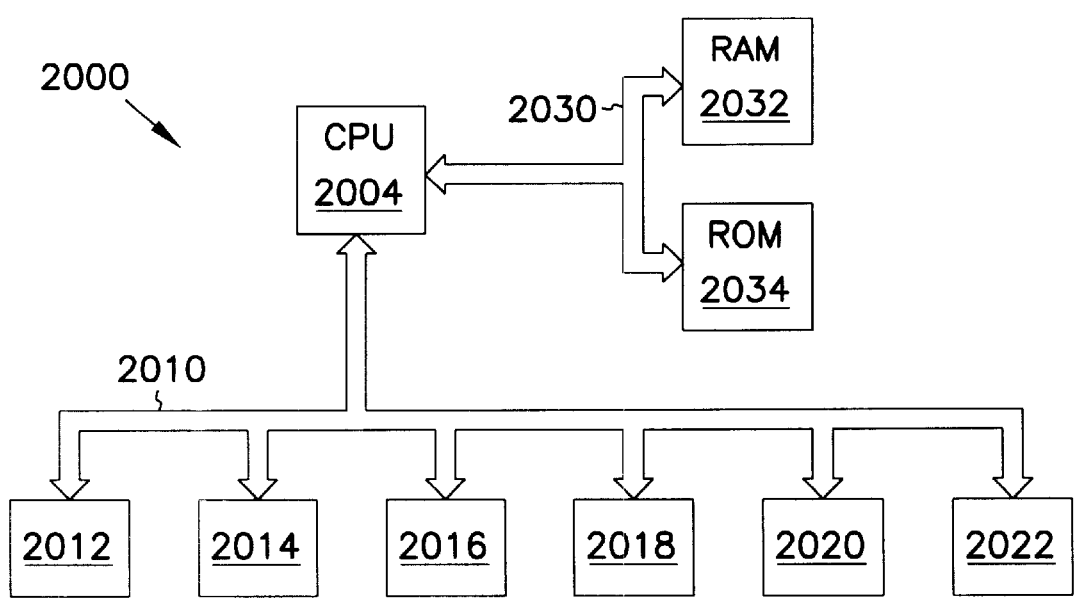
FIG. 17 is a schematic view of a computer system.

FIG. 17 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disk drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disk drives, magneto optical drives, floppy disk drives, monitors, keyboards and other such peripherals. Any type of disk drive may use the slider having motion or attitude limiters as discussed above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A head gimbal assembly comprising:
   a load spring;
   a slider attached to said load spring, the slider having
      an air bearing face; and
      an opposing backside face having a perimeter, one of said slider and said load spring having a load protuberance and the other of said slider and said load beam having surface for receiving the load protuberance, said load protuberance and said surface for receiving the load protuberance forming a gimbal; and
   means totally within the perimeter of the backside face for limiting the amount of roll motion of the slider, wherein the means for limiting the amount of roll motion of the slider includes an attitude limiting device made of tape which dampens vibration of the gimbal.

2. The head gimbal assembly of claim 1 further comprising means for limiting the amount of pitch motion of the slider which further limits the amount of pitch motion allowed by the gimbal, wherein means for limiting the amount of roll motion of the slider is free of one of the load spring and the slider during a selected range of roll motion.

3. The head gimbal assembly of claim 1 wherein means for limiting the amount of pitch motion of the slider includes an attitude limiting device attached to the slider, the attitude limiting device further limiting the amount of pitch motion allowed by the gimbal, wherein means for limiting the amount of roll motion of the slider is free of one of the load spring and the slider during a selected range of roll motion.

4. The head gimbal assembly of claim 3 wherein the attitude limiting device attached to the slider is formed as part of the slider.

5. The head gimbal assembly of claim 1 wherein means for limiting the amount of roll motion of the slider includes an attitude limiting device attached to the load spring, the attitude limiting device further limiting the amount of pitch motion allowed by the gimbal, wherein means for limiting the amount of roll motion of the slider is free of one of the load spring and the slider during a selected range of roll motion.

6. The head gimbal assembly of claim 5 wherein the attitude limiting device is formed as part of the load spring.

7. A head gimbal assembly comprising:
   a load spring having a first major surface and a second major surface;
   a slider further including
      an air bearing surface; and
      a backside surface, the backside surface having a perimeter, the slider attached to said load spring, one of said slider and said load spring having a load protuberance and the other of said slider and said load spring having a surface for receiving the load protuberance, said load protuberance and said surface for receiving the load protuberance forming a gimbal; and an attitude limiting device attached to one of the backside surface of the slider or the major surface of the load spring positioned nearest the backside surface of the slider, the attitude limiting device having a contact surface positioned totally within the boundaries of the backside surface of the slider and positioned between the backside surface of the slider and the major surface of the load spring nearest the backside surface of the slider.

8. The head gimbal assembly of claim 7 wherein the attitude limiting device attached to the slider is formed as part of the slider.

9. The head gimbal assembly of claim 7 wherein the attitude limiting device attached to the slider is further comprised of at least one pad positioned on the slider to limit motion about the roll axis.

10. The head gimbal assembly of claim 7 further comprised of at least one pad attached to the slider and positioned to limit motion about the pitch axis.

11. The head gimbal assembly of claim 7 wherein the attitude limiting device attached to the slider is further comprised of tape positioned on the slider to limit motion about the pitch axis, the tape providing dampening of motion about the pitch axis.

12. The head gimbal assembly of claim 11 wherein the attitude limiting device attached to the slider is further comprised of tape positioned on the slider to limit motion about the roll axis, the tape providing dampening of motion about the pitch axis.

13. The head gimbal assembly of claim 11 wherein the attitude limiting device attached to the load spring is further comprised of tape positioned on the slider to limit motion about the roll axis, the tape providing dampening of motion about the pitch axis.

14. The head gimbal assembly of claim 7 further comprising a flexure portion having a portion which is attached to the slider, the flexure portion having attitude limiting features therein.

15. The head gimbal assembly of claim 7 further comprising a flexure portion having a portion which is attached to the slider, the flexure portion having attitude limiting features stamped therein.

16. The head gimbal assembly of claim 7 wherein the load spring has attitude limiting features therein.

17. The head gimbal assembly of claim 7 wherein the attitude limiting device attached to the backside surface of the slider, the backside surface of the slider and the major surface of the load spring nearest the backside surface of the slider are placed in compression when the attitude limiting device contacts the load beam.

18. A head gimbal assembly comprising:
a load spring further comprising:
a first major surface; and
a second major surface;
a slider further comprising:
an airbearing surface; and
a backside surface, the slider attached to said load spring, one of said slider and said load spring having a load protuberance and the other of said slider and said load spring having surface for receiving the load protuberance, said load protuberance and said surface for receiving the load protuberance forming a gimbal; and
an attitude limiting device attached to the load spring on one of the first major surface and the second major surface of the load spring nearest the slider, the attitude limiting device having a contact surface positioned on the load spring within the boundaries of the area where the surface of the slider interacts with the load spring, the contact surface of the attitude limiting device positioned between the backside surface of the slider and the one of the first major surface and the second major surface of the load spring nearest the slider.

19. The head gimbal assembly of claim 18 further comprised of at least one pad attached to the load spring and positioned to limit motion about the pitch axis.

20. The head gimbal assembly of claim 18 wherein the attitude limiting device attached to the load spring is further comprised of tape positioned on the slider to limit motion about the pitch axis, the tape providing dampening of motion about the pitch axis.

21. The head gimbal assembly of claim 18 wherein the attitude limiting device attached to the major surface of the slider nearest the backside surface of the slider, the attitude limiting device, and the backside surface of the slider are placed in compression when the attitude limiting device contacts the backside surface of the slider.

22. A head gimbal assembly comprising:
a load spring further comprising:
a first major surface; and
a second major surface;
a slider further comprising:
an air bearing surface; and
a backside surface, the slider attached to said load spring, one of said slider and said load spring having a load protuberance and the other of said slider and said load spring having a surface for receiving the load protuberance, said load protuberance and said surface for receiving the load protuberance forming a gimbal; and
a pad including dampening material attached to one of the slider or the load spring, the pad including a contact surface, the contact surface of the pad positioned between the backside surface of the slider and the one of the first major surface and the second major surface of the load spring nearest the backside surface of the slider, the pad limiting the attitude of the slider.

23. The head gimbal assembly of claim 22 wherein the contact surface of the pad, the backside surface of the slider and the one of the first major surface and the second major surface of the load spring nearest the backside surface of the slider are placed in compression when the contact surface of the pad contacts one of the load beam or the slider.

24. A head gimbal assembly comprising:
a load spring further comprising:
a first major surface; and
a second major surface;
a slider attached to said load spring, the slider having
an air bearing surface; and
an opposing backside surface, one of the backside surface of the slider, or the one of the first major surface and the second major surface of the load spring nearest the backside surface of the slider, having a load protuberance and
the other of the backside surface of the slider, or the one of the first major surface and the second major surface of the load spring nearest the backside surface of the slider providing the gimballing surface for the load protuberance, said load protuberance and the gimballing surface forming a gimbal; and
an attitude limiting device attached to at least one of the backside surface of the slider, or the one of the first major surface and the second major surface of the load spring nearest the backside surface of the slider, wherein the attitude limiting device further comprises a first portion attached to the gimballing surface and a second portion attached to the surface including the load protuberance.

25. The head gimbal assembly of claim 24 wherein the attitude limiting device has a height less than the height of a gimbal dimple.

* * * * *